United States Patent
Wang et al.

(10) Patent No.: US 8,683,889 B2
(45) Date of Patent: Apr. 1, 2014

(54) OBLIQUE-DRIVEN PLATFORM STRUCTURE

(75) Inventors: Shih-Ming Wang, Taipei (TW); Yan-Hong Chen, Chiayi (TW)

(73) Assignee: Chung Yuan Christian University (TW)

( * ) Notice: Subject to any disclaimer, the term of this patent is extended or adjusted under 35 U.S.C. 154(b) by 125 days.

(21) Appl. No.: 13/517,714

(22) Filed: Jun. 14, 2012

(65) Prior Publication Data

US 2013/0333500 A1 Dec. 19, 2013

(51) Int. Cl.
*G05G 11/00* (2006.01)
(52) U.S. Cl.
USPC ........................................................ 74/490.09
(58) Field of Classification Search
USPC .................................. 74/490.08, 490.09
See application file for complete search history.

(56) References Cited

U.S. PATENT DOCUMENTS

| | | | | |
|---|---|---|---|---|
| 3,645,001 A | * | 2/1972 | Bosworth et al. | 33/567.1 |
| 4,838,515 A | * | 6/1989 | Prentice | 248/661 |
| 5,731,641 A | * | 3/1998 | Botos et al. | 310/12.06 |
| 5,996,437 A | * | 12/1999 | Novak et al. | 74/490.09 |
| 6,186,024 B1 | * | 2/2001 | Leiber | 74/490.09 |

* cited by examiner

*Primary Examiner* — Justin Krause (57) ABSTRACT

The present invention relates to an oblique-driven platform structure, comprising: a base, a first rail, a screw, a first sliding block, a second sliding block, an oblique slide rod, at least one second rail, at least one third sliding block, a work platform, and a motor. There is a trigonometric relation between the oblique slide rod, the screw and the second rail, and an oblique drive angle is formed between the oblique slide rod and the screw; Therefore, with the change of the stroke position of the screw, the displacement resolution of the work platform can still kept the same value when the work platform is driven. Moreover, the displacement of the screw stroke can be proportionally transformed to the feed rate of the work platform through the trigonometric relation, such that the driven work platform can get an extremely high displacement resolution without using any high-level servo motor.

14 Claims, 12 Drawing Sheets

OBLIQUE-DRIVEN PLATFORM STRUCTURE

BACKGROUND OF THE INVENTION

1. Technical Field

The present invention relates to a high-precision machine tool platform, and more particularly, to an oblique-driven platform structure.

2. Description of Related Art

With the development of industry and technology, every industrial product now progresses toward micro and concise. Hence, a new developed topic on micro/meso-scale manufacturing technology will be critical to manufacturing technology, wherein the micro/meso-scale drilling technology can be applied to national defense, aerial transportations, electronic devices, optical devices, communication, and bio-medical industry, particularly to high speed communication micro optical devices, micro-actuator and micro-sensor on vehicle and medical tools, micro-nozzle on high temperature jet engine, and micro fuel cell.

Currently, the micro/meso-scale drilling technology is mostly achieved by using multi-axles machine tool, wherein the multi-axles machine tool is belong to serial connected mechanism, and its driving way is carried out though the cooperation of hydrostatic linear guide ways and linear motors. The multi-axles machine tool includes the advantages of rapid operation and no back clearance; however, it also has the drawbacks of difficult to assembly and high equipment cost. In addition, the serial connected mechanism needs a huge working area because it has the main structure of cantilever. So that, the serial connected mechanism may deform or have displacement due to external loading or its weight. Moreover, only the conventional servo system of serial connected mechanism of higher precision may achieve the precision of sub-micron or even nano-meter scaled.

Accordingly, the manufacturers of machine tools study and then propose a toggle-type positioning platform, which is able to transform the displacement of a screw to the feed rate of a work platform by using a trigonometric relation; besides, the toggle-type positioning platform can meet the requirement of high resolution and high precision without using any high-level servo mechanisms (i.e., the linear motors and the hydrostatic linear guide ways).

Figure 1:
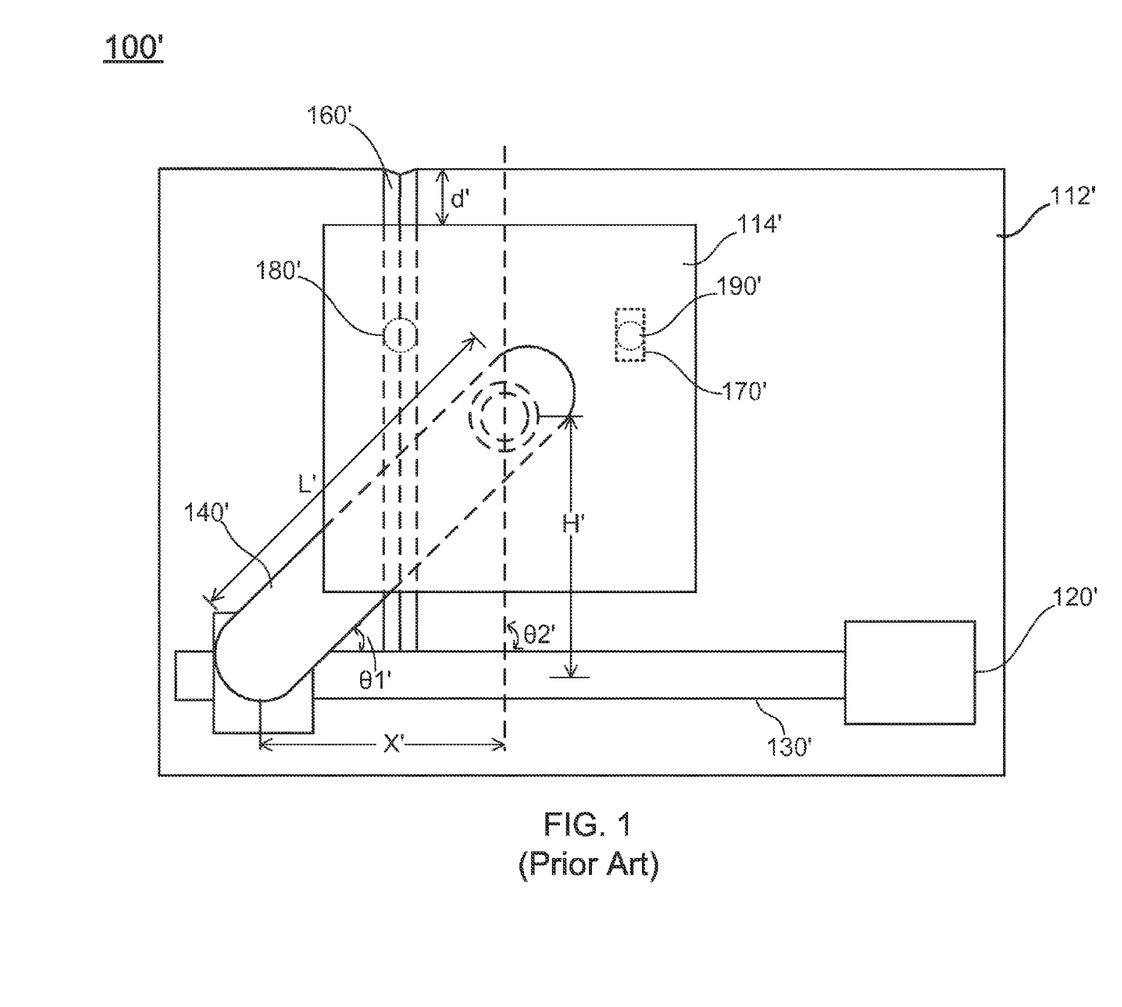
FIG. 1 is a top view of a toggle-type positioning platform.

Please refer to FIG. 1, which illustrates a top view of the toggle-type positioning platform. As shown in FIG. 1, the toggle-type positioning platform 100' includes: a first platform 112', a motor 120', a screw 130', a second platform 114', and a connecting rod 140'. The motor 120', the screw 130' and the second platform 114' are disposed on the first platform 112', and the second platform 114' can motion on the first platform 112' along a predicted way d' back and forth, wherein an included angle θ2' is formed between the extension direction of the predicted way d' and the screw 130', and an included angle θ1' is formed between the connecting rod 140' and the screw 130'.

The connecting rod 140' is located between the first platform 112' and the second platform 114', and simultaneously connecting to the second platform 114' and the screw 130', wherein the connecting rod 140' is indirectly connected with the screw 130' through a sliding block 141'. Therefore, when the screw 130' rotates, the connecting rod 140' would be driven to move and further drive the second platform 114' to motion along the predicted way d'. As shown in FIG. 1, the first platform 112' has a guide groove 160'; besides, a ball bearing 180' is disposed in the guide groove 160' and located between the first platform 112' and the second platform 114'. Therefore, the ball bearing 180' would move along the guide groove 160' when the second platform 114' moves along the predicted way d', and this way is able to steady the motion of the second platform 114'.

Furthermore, for increasing the stability of the second platform 114', a guide rail 170' is added into the first platform 112', and a roller bearing 190' is disposed in the guide rail 170' and located between the first platform 112' and the second platform 114'. Thus, the roller bearing 189' would move along the guide rail 170' when the second platform 114' moves along the predicted way d', and this way is able to increase the stability of the second platform 114'.

Figure 2:
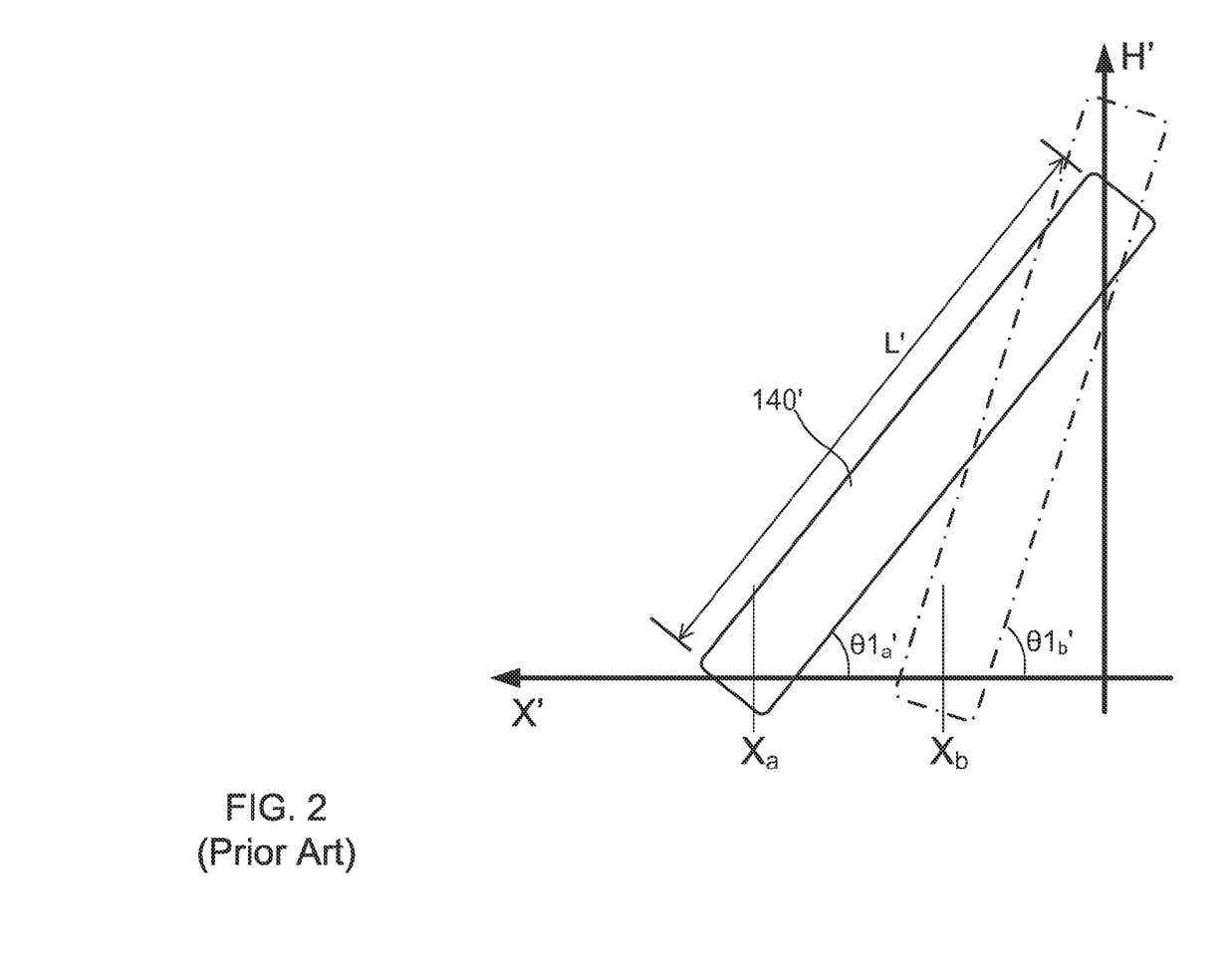
FIG. 2 is a schematic motion diagram of a connecting rod of the toggle-type positioning platform.

Please refer to FIG. 2, there is shown a schematic motion diagram of a connecting rod of the toggle-type positioning platform. As shown in FIG. 2, X' represents the position of the sliding block 114' on the stroke position of the connecting rod 140' on the screw 130', H' represents the displacement resolution of the second platform 114', and L' represents the length of the connecting rod 140'. Because the stroke position X', the displacement resolution of platform H' and the length L' construct a geometric triangle, a trigonometric relation is formed between the stroke position X', the displacement resolution of platform H' and the length L'. Therefore, through the trigonometric relation, it is able to calculate the displacement resolution of platform H' easily.

By above descriptions, it can know that the toggle-type positioning platform 100' has the advantages of easy to calculate the displacement resolution of platform H' and high platform stability. However, the toggle-type positioning platform 100' is still not perfect and includes some drawbacks. As shown in FIG. 2, when the connecting rod 140' moves with the motion of the second platform 114', the included angle θ1 is changed from θ1a' to θ1a' when the connecting rod 140' moves from the stroke position Xa' to the stroke position Xb'. The change of the included angle θ1 means that the trigonometric relation between the stroke position X', the displacement resolution of platform H' and the length L' is changed, therefore the value of the displacement resolution of platform H' calculated through the trigonometric relation between the stroke position X', the displacement resolution of platform H' and the length L' is also be changed.

Figure 3:
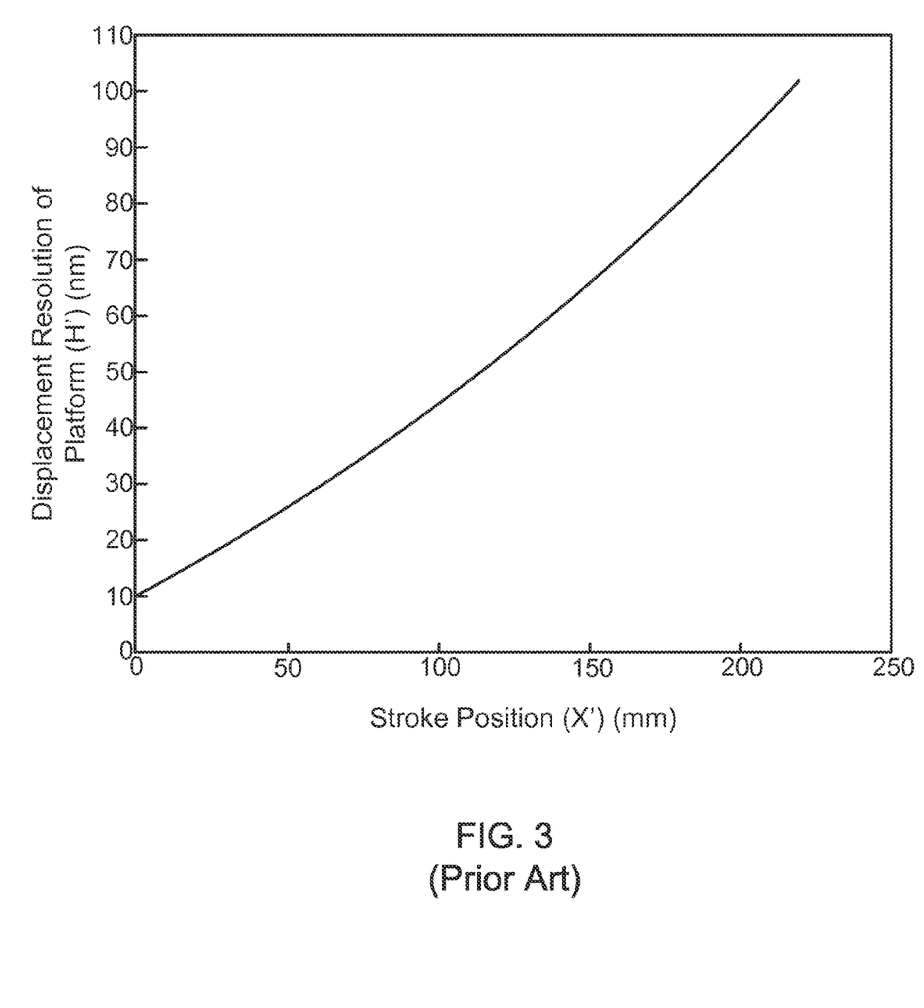
FIG. 3 is a curve plot diagram of the screw stroke position and the platform displacement resolution.

Please continuously refer to FIG. 2, and simultaneously refer to FIG. 3, which illustrates a curve plot diagram of the screw stroke position and the platform displacement resolution. In the toggle-type positioning platform 100', the minimum resolution of the stroke position X' is dominated by the motor 120' and the screw 130', and the minimum stroke position resolution would affect the minimum resolution of the displacement resolution of platform H'. Herein, the motor 120' and the screw 130' used for contributing the data shown in FIG. 3 provide the minimum stroke position resolution of 1 μm, and the minimum resolution of the displacement resolution of platform H' can reach nano-meter level by using the toggle-type positioning platform 100'. Moreover, through the data shown in FIG. 3, it can also find that the value of the displacement resolution of platform H' is changed with the increase of the stroke position X' of the screw 130'. It means that the displacement resolution of platform H' is not a constant in the toggle-type positioning platform 100'. More clearly to explain that, the displacement resolution of platform H' is getting worse with the increase of the stroke position X' of the screw 130'.

Accordingly, in view of the conventional multi-axles machine tools and the toggle-type positioning platform still have some shortcomings and drawbacks, the inventor of the present application has made great efforts to make inventive research thereon and eventually provided an oblique-driven platform structure.

BRIEF SUMMARY OF THE INVENTION

The primary objective of the present invention is to provide an oblique-driven platform structure, in which the displacement of the screw stroke can be proportionally transformed to the feed rate of the work platform through the trigonometric relation, such that the driven work platform can get an extremely high displacement resolution without using any high-level servo mechanisms.

The another objective of the present invention is to provide an oblique-driven platform structure, in which, there is a trigonometric relation between the oblique slide rod, the screw and the second rail of the oblique-driven platform structure, and an oblique drive angle is formed between the oblique slide rod and the screw; Therefore, by such mechanism design, the displacement resolution of the work platform can still kept the same value with the change of the stroke position of the screw, and then the work platform may have steady and precise feed rate resolution.

Accordingly, to achieve the above objectives of the present invention, the inventor proposes an oblique-driven platform structure, comprising:

a base;

a first rail, disposed on the base;

a screw, disposed on the first rail;

a first sliding block, disposed on the screw and able to slide along the first rail by way of the rotation of the screw;

a second sliding block, disposed on the first sliding block and having an accommodating groove;

an oblique slide rod, disposed on the second sliding block and partially accommodated in the accommodating groove, wherein an oblique drive angle is formed between the oblique slide rod and the screw, and the value of oblique drive angle is definable;

at least one second rail, disposed on the base and perpendicular to the first rail oppositely;

at least one third sliding block, disposed on the second rail and capable of sliding on the second rail back and forth;

a work platform, simultaneously connected to the third sliding block and the oblique slide rod; and a motor, coupled to the screw;

wherein when the motor is operated to drive the screw, the first sliding block slides along the first rail through the rotation of screw; moreover, when the first sliding block slides on first rail, the oblique slide rod would slide in the accommodating groove for keeping the value of oblique drive angle;

wherein when the oblique slide rod slides in the accommodating groove, the third sliding block is driven by the oblique slide rod and slides along the second rail, so as to further drive the work platform make displacement.

Moreover, to achieve the above objectives of the present invention, the inventor proposes an another embodiment of the oblique-driven platform structure, comprising:

a base;

a screw, disposed on the base through two fixing block 1Ga;

a first sliding block, disposed on the screw and able to slide on the base back and forth by way of the rotation of the screw;

a second sliding block, disposed on the first sliding block and having an accommodating groove;

an oblique slide rod, disposed on the second sliding block and partially accommodated in the accommodating groove, wherein an oblique drive angle θ is formed between the oblique slide rod and the screw, and the value of oblique drive angle is definable;

at least one first rail, disposed on the base and perpendicular to the screw oppositely;

at least one third sliding block, disposed on the first rail and capable of sliding on the first rail back and forth;

a work platform, simultaneously connected to the third sliding block and the oblique slide rod; and a motor, coupled to the screw;

wherein when the motor is operated to drive the screw, the first sliding block slides on the base through the rotation of screw; moreover, when the first sliding block slides, the oblique slide rod simultaneously slides in the accommodating groove for keeping the value of oblique drive angle;

wherein when the oblique slide rod slides in the accommodating groove, the third sliding block is driven by the oblique slide rod and slides along the first rail, so as to further drive the work platform make displacement.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE INVENTION

To more clearly describe an oblique-driven platform structure according to the present invention, embodiments of the present invention will be described in detail with reference to the attached drawings hereinafter.

Figure 4:
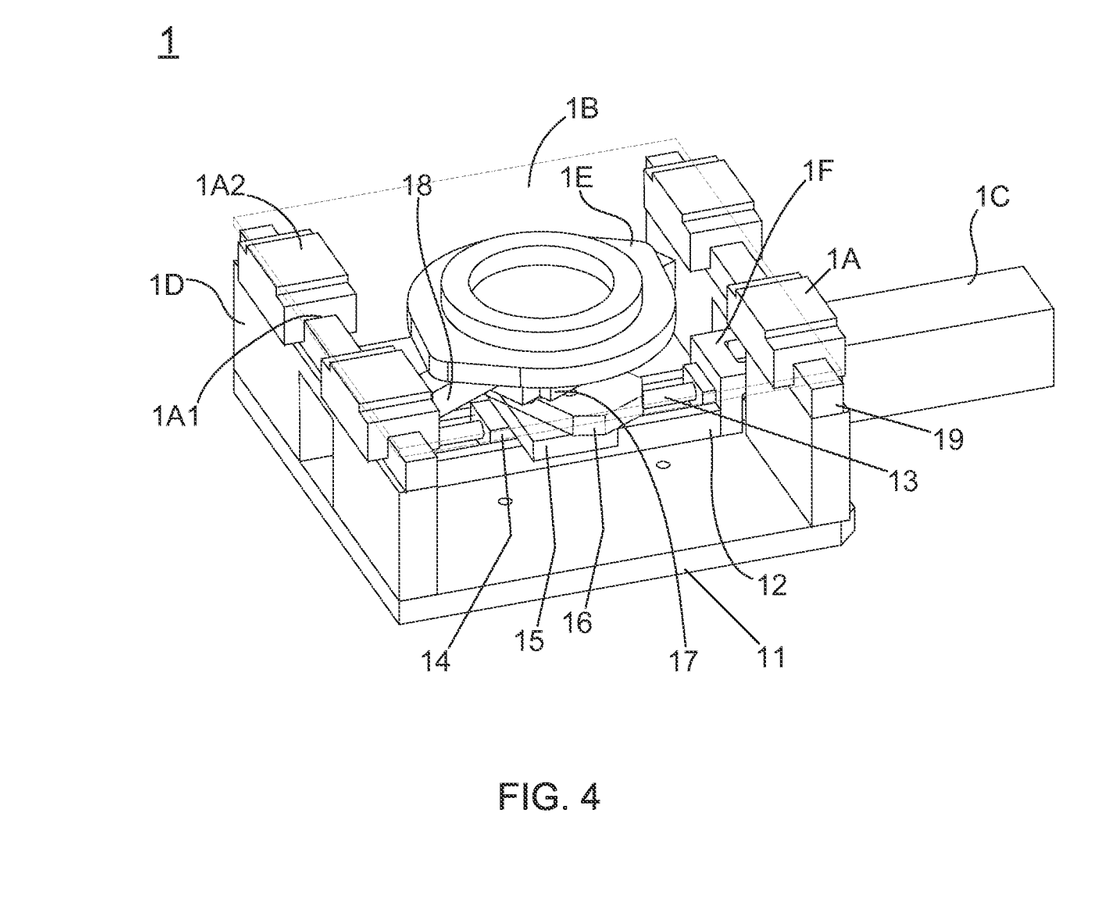
FIG. 4 is a stereo view of an oblique-driven platform structure according to the present invention.
Figure 5:
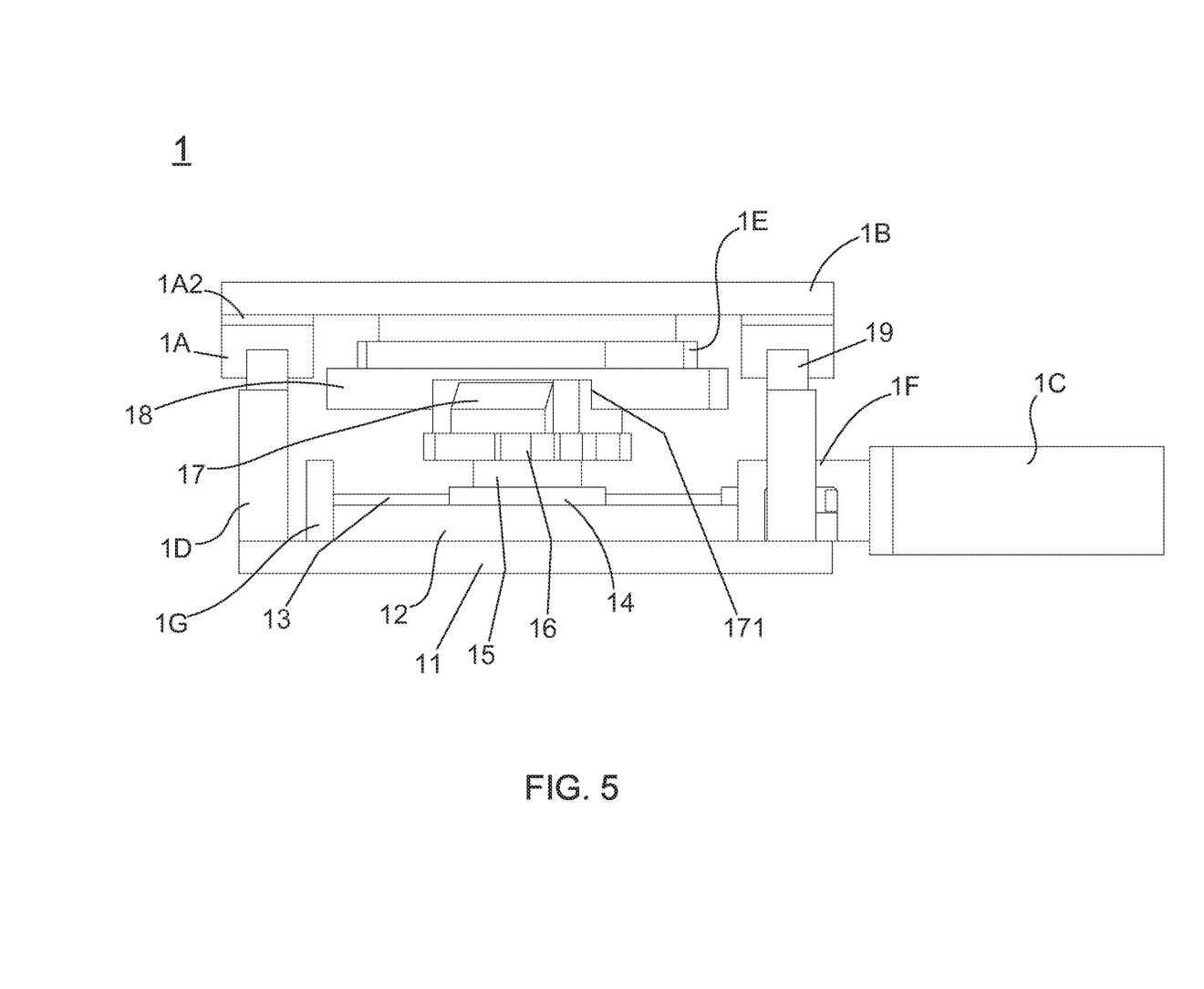
FIG. 5 is a side view of the oblique-driven platform structure.
Figure 6:
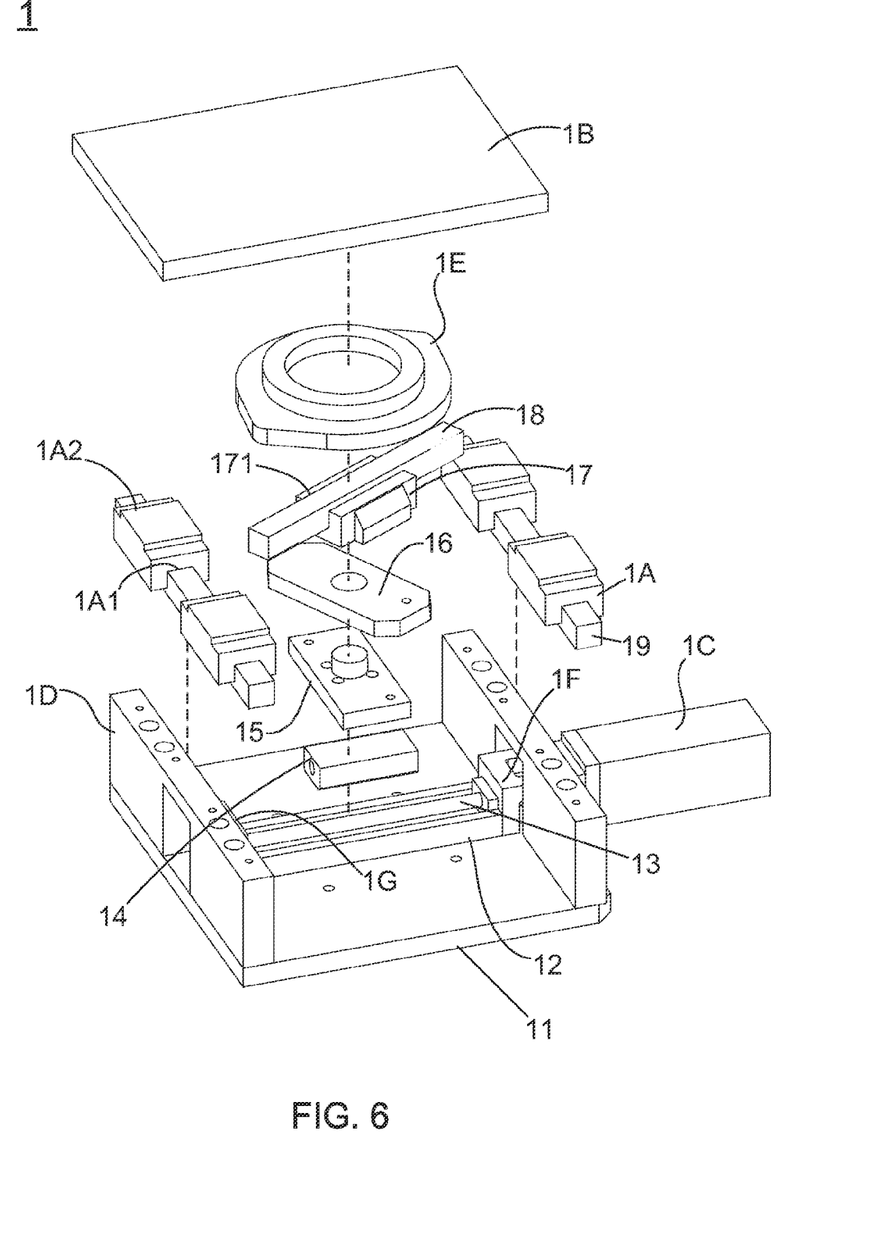
FIG. 6 is an exploded view of the oblique-driven platform structure.

Please refer to FIG. 4, FIG. 5 and FIG. 6, there are shown a stereo view, a side view and an exploded view of an oblique-driven platform structure according to the present invention. As shown in FIG. 4, FIG. 5 and FIG. 6, the oblique-driven platform structure 1 of the present invention includes: a base 11, a first rail 12, a first sliding block 14, a rotation axis 15, a rotation axis bearing block 16, a second sliding block 17, an oblique slide rod 18, two second rails 19, four third sliding blocks 1A, a work platform 1B, a motor 1C, two supporting member 1D, a platform connecting member 1E, a motor base 1F, and a fixing block 1G.

Figure 8:
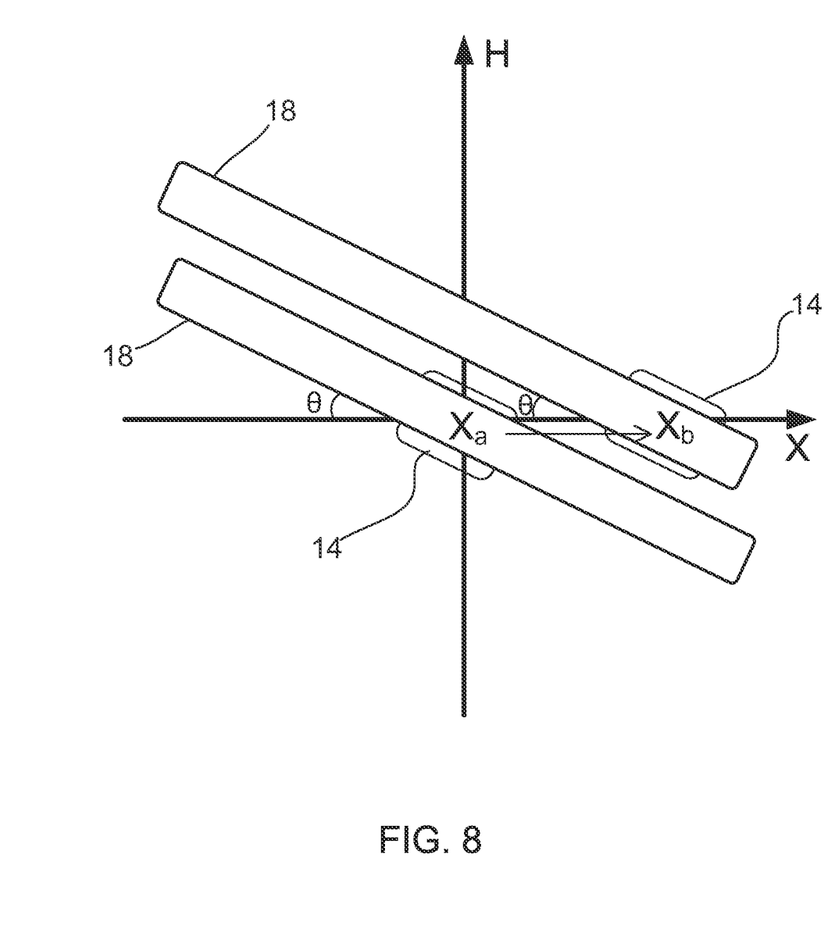
FIG. 8 is a schematic relationship diagram of the screw stroke position of sliding block and the platform displacement resolution.

The first rail 12 is disposed on the base 11, and the screw 12 is disposed in the first rail 12. The first sliding block 14 is disposed on the screw 13 and able to slide along the first rail 12 by way of the rotation of the screw 13. The rotation axis 15 is disposed on the first sliding block 14, and the rotation axis bearing block 16 is disposed on the rotation axis 15. The second sliding block 17 is disposed on the rotation axis bearing block 16 and has an accommodating groove 171, and the oblique slide rod 18 is disposed on the second sliding block 17 and partially accommodated in the accommodating groove 171, wherein an oblique drive angle θ is formed between the oblique slide rod 18 and the screw 13, and the value of oblique drive angle θ (the oblique drive angle θ is shown in FIG. 8) is definable. In addition, the rotation axis 15 and the rotation axis bearing block 16 can be rotated with a rotational degree of freedom for adjusting the value of the oblique drive angle θ.

The two supporting members 1D are oppositely disposed on the base 11 for supporting the second rails 19 and forming an altitude difference between the second rail 19 and the surface of the base 11, wherein the second rails 19 on the supporting members 1D are perpendicular to the first rail 12 oppositely. Every two third sliding blocks 1A are disposed on one second rail 19, in which, each third sliding block 1A includes a sliding groove 1A1 and a platform connecting portion 1A2, and the third sliding block 1A is connected to the second rail 19 through the sliding groove 1A1.

The work platform 1B is simultaneously connected to the platform connecting portions 1A2 of the third sliding blocks 1A and the oblique slide rod 18. The motor 1C is coupled to the screw 13, and a motor base 1F is disposed between the motor 1C and the screw 13 for fixing the motor 1C and steadying the screw 13. In addition, the fixing block 1G is disposed on the base 11 and opposite to the motor 1C, used for connecting the first rail 12 and the screw 13 and fixing the first rail 12 and the screw 13 on the base 11. The platform connecting member 1E is disposed between the work platform 1B and the oblique slide rod 18 for making the work platform 1B connect to the oblique slide rod 18 by indirect way. Similar to the rotation axis 15 and the rotation axis bearing block 16, the platform connecting member 1E can also be rotated with a rotational degree of freedom.

Thus, all constituting elements of the oblique-driven platform structure 1 have been introduced and described through above descriptions. In the oblique-driven platform structure 1, when the motor 1C is operated to drive the screw 13, the first sliding block 14 would slides along the first rail 12 through the rotation of screw 13; Then, when the first sliding block 14 slides on first rail 12, the oblique slide rod 18 would slides in the accommodating groove 171 for keeping the value of oblique drive angle θ. Moreover, when the oblique slide rod 18 slides in the accommodating groove 171, the third sliding block 1A is driven by the oblique slide rod 18 and slides along the second rail 19, such that the work platform 1B would be driven to make displacement. Herein, to prevent from the sudden rotation of the rotation axis 15 and the rotation axis bearing block 16 changing the oblique drive angle θ, it must to confirm whether the rotation axis bearing block 16 is disposed and fixed on the rotation axis 15 before operating the oblique-driven platform structure 1.

Figure 7A:
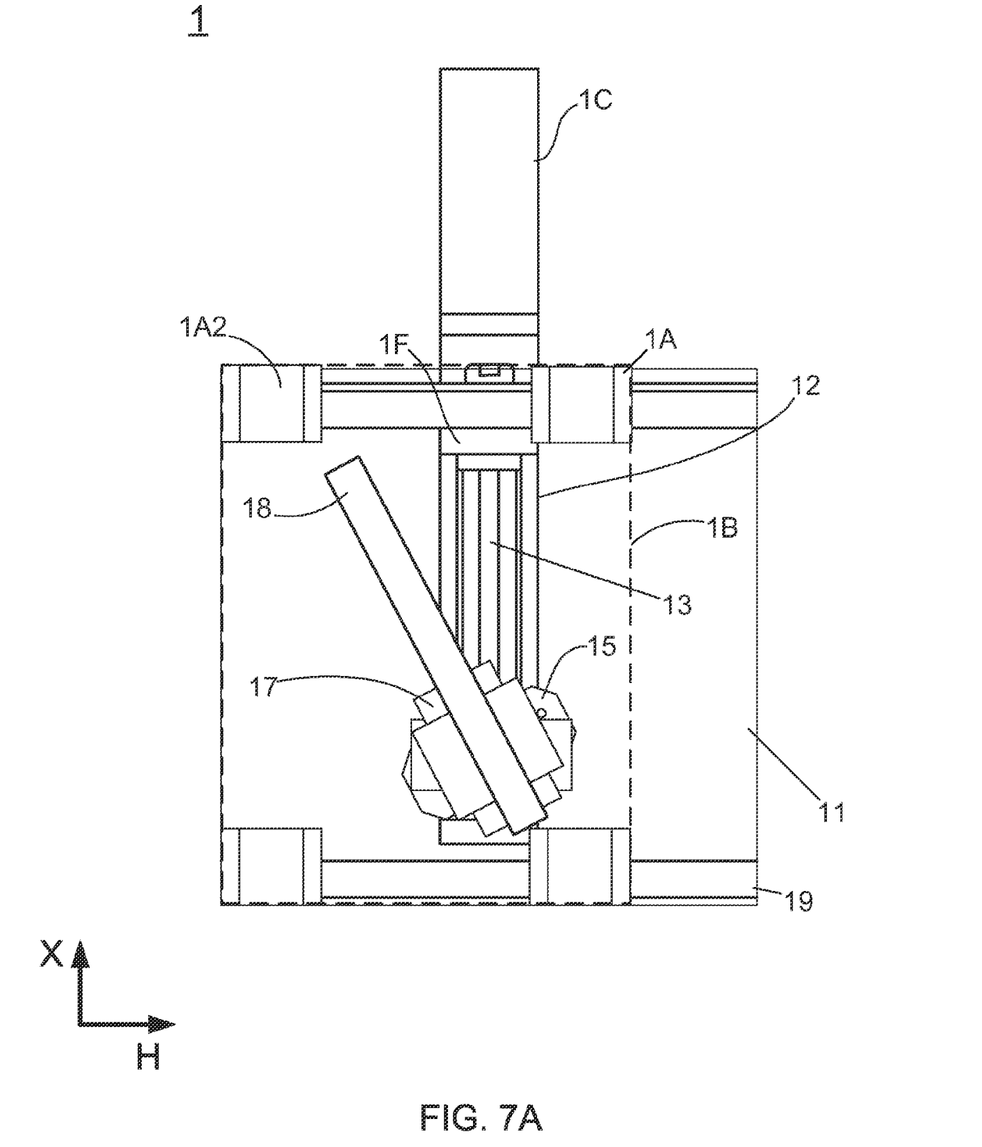
FIGS. 7A, 7B and 7C are motion diagrams of the oblique-driven platform structure.

To more clearly describe the motion relationship between the screw 13, the first block 14, the second sliding block 17, the oblique slide rod 18, and the work platform 1B and the particular efficiency produced by the motion relationship, the relative descriptions will be made detailedly with reference to the schematic motion drawings hereinafter. Please refer to FIG. 7A, FIG. 7B and FIG. 7C, there are shown motion diagrams of the oblique-driven platform structure. As shown in FIG. 7A, the work platform 1B is moved to the least left side of the base 11. And as shown in FIG. 7B, when the motor 1C operates to drive the screw 13, the first sliding block 14 would slide along the first rail 12, and then the oblique slide rod 18 slides in the accommodating groove 171 for keeping the value of oblique drive angle θ.

Figure 7B:
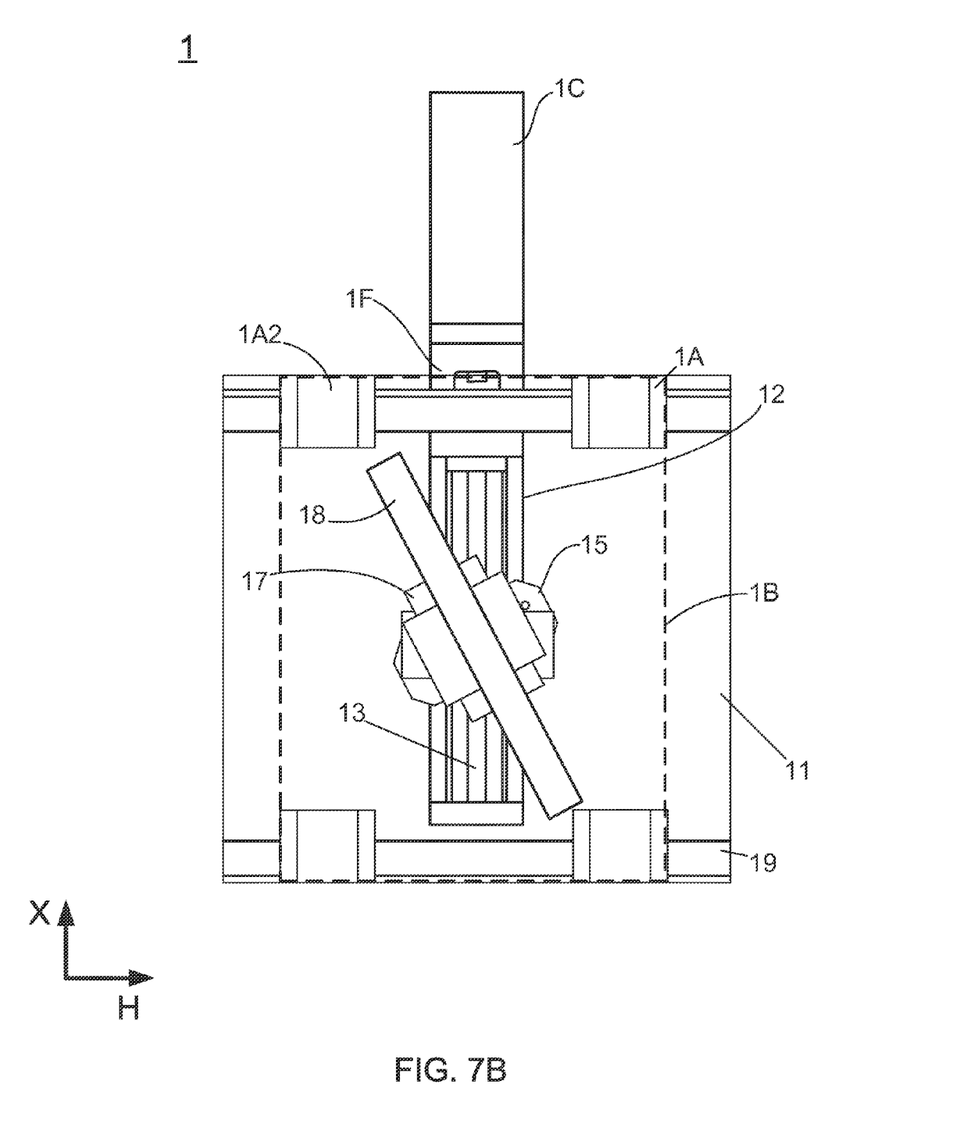
Figure 7C:
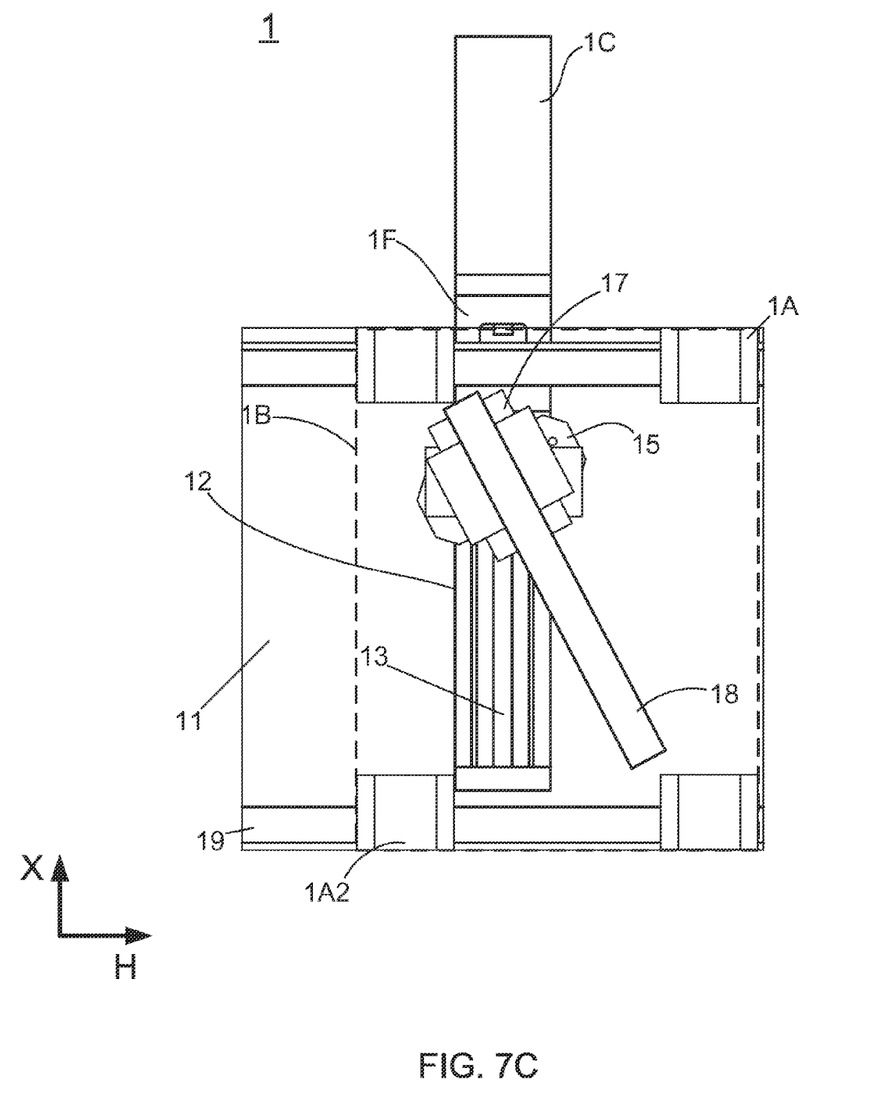

Inheriting to above description of FIG. 7B, when the oblique slide rod 18 slides in the accommodating groove 171, the third sliding block 1A is driven by the oblique slide rod 18 and slides along the second rails 19, so as to facilitate the work platform 1B make displacement. Eventually, as shown in FIG. 7C, when the motor 1C continuously operates and drives the screw 13 to rotate, the first sliding block 14 would slides to the end of the first rail 12, and the work platform 1B is driven by the oblique slide rod 18 and moves to the least right side of the base 11.

Figure 9:
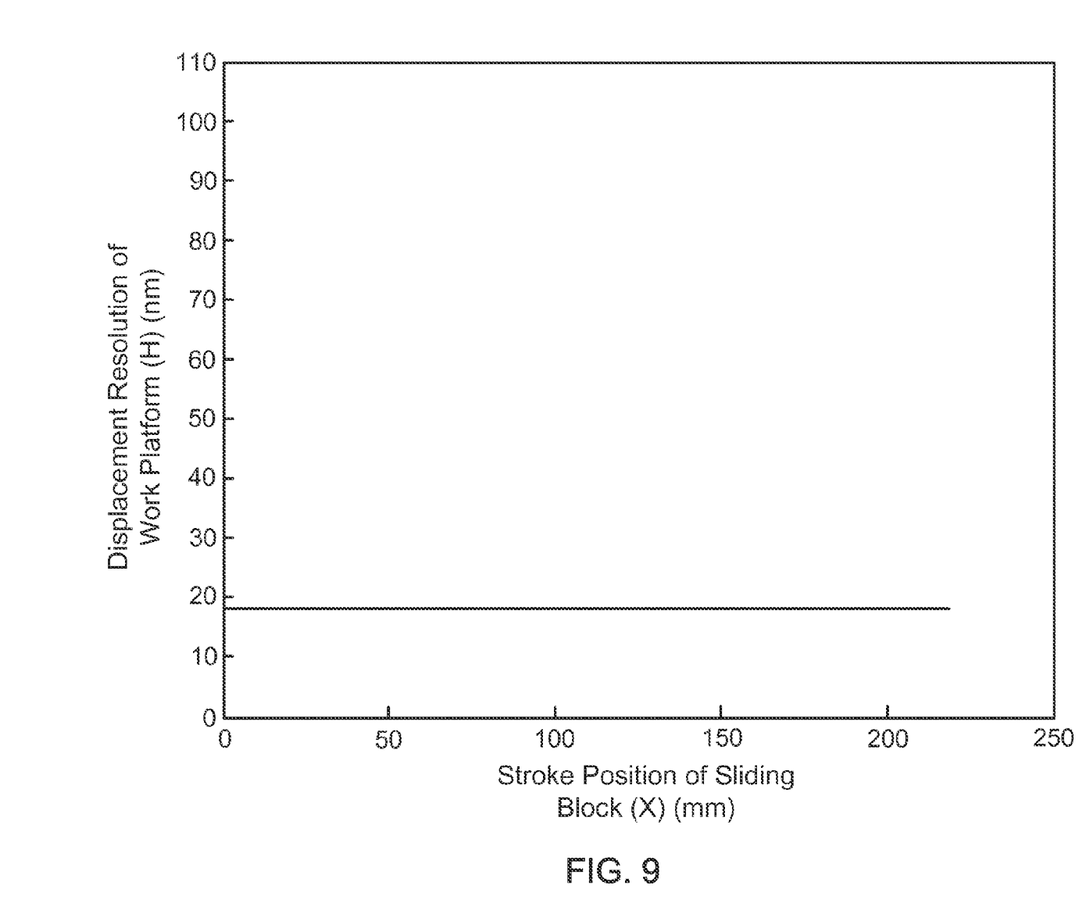
FIG. 9 is a curve plot diagram of the screw stroke position of sliding block and the platform displacement resolution.

Please refer to FIG. 8 and FIG. 9, there are shown a schematic relationship diagram and a curve plot diagram of the screw stroke position of sliding block and the platform displacement resolution. As shown in FIG. 7A and FIG. 8, in the present invention, there is a trigonometric relation between the oblique slide rod 18, the screw 13 and the second rail 19, and position of the first sliding clock 14 on the the screw stroke position X can be transformed to the platform displacement resolution H of the work platform 1B through the trigonometric relation, such that the driven work platform 1B can get an extremely high platform displacement resolution H.

Moreover, the most important feature in the present invention is that, as shown in FIG. 8, when the first sliding block 14 slides from stroke position $X_a$ to stroke position $X_b$, the platform displacement resolution H of the work platform 1B would be changed from $H_a$ to $H_b$ ($H_a$ and $H_b$ does not especially marked on FIG. 8). Meanwhile, as shown in FIG. 8, it is able to know that the oblique drive angle θ is still kept the same value in spite of the screw stroke position of sliding block X is at $X_b$. It means that the trigonometric relation between the oblique slide rod 18, the screw 13 and the second rail 19 does not be changed, and the platform displacement resolution H of the work platform 1B would be constant. And the curve plot shown in FIG. 9 also proves such result. Moreover, through above descriptions and the related results, it is able to understand that how to modulate the platform displacement resolution H of the work platform 1B is to adjust the value of the oblique drive angle θ.

Moreover, In the oblique-driven platform structure 1, the minimum resolution of position of sliding block on the screw stroke X is dominated by the motor 1C and the screw 13, and the minimum stroke position resolution would affect the minimum resolution of the platform displacement resolution H of the work platform 1B. Herein, the motor 1C and the screw 13 used for contributing the data shown in FIG. 9 provide the minimum resolution of position of the sliding block is 1 μm, and the minimum resolution of the platform displacement resolution H can reach nano-meter level by using the oblique-driven platform structure 1.

Therefore, through detailed descriptions by using the stereo, the exploded and the schematic motion diagrams, the oblique-driven platform structure of the present invention has been clearly and completely introduced; in summary, the present invention has the following advantages:

1. Comparing to the conventional toggle-type positioning platform, not only the work platform of the oblique-driven platform structure has extremely high-precision platform displacement resolution, but also the platform displacement resolution thereof can still be kept to a constant in spite of the screw stroke position of sliding block is changed.
2. Inheriting to above point 1, for this reason, when the oblique-driven platform structure is applied to the machine tools, the oblique-driven platform structure may provide the feed rate with high stability, high-resolution and high-precision to the machine tools without using any high level servo mechanism (i.e., linear motor and hydrostatic linear guide ways).

3. Inheriting to above point 2, moreover, by adjusting the value of the oblique drive angle, the work platform of the oblique-driven platform structure can be modulated for meeting various cutting requirements of the machine tools, so as to facilitate the machine tools show better performance.

Figure 10:
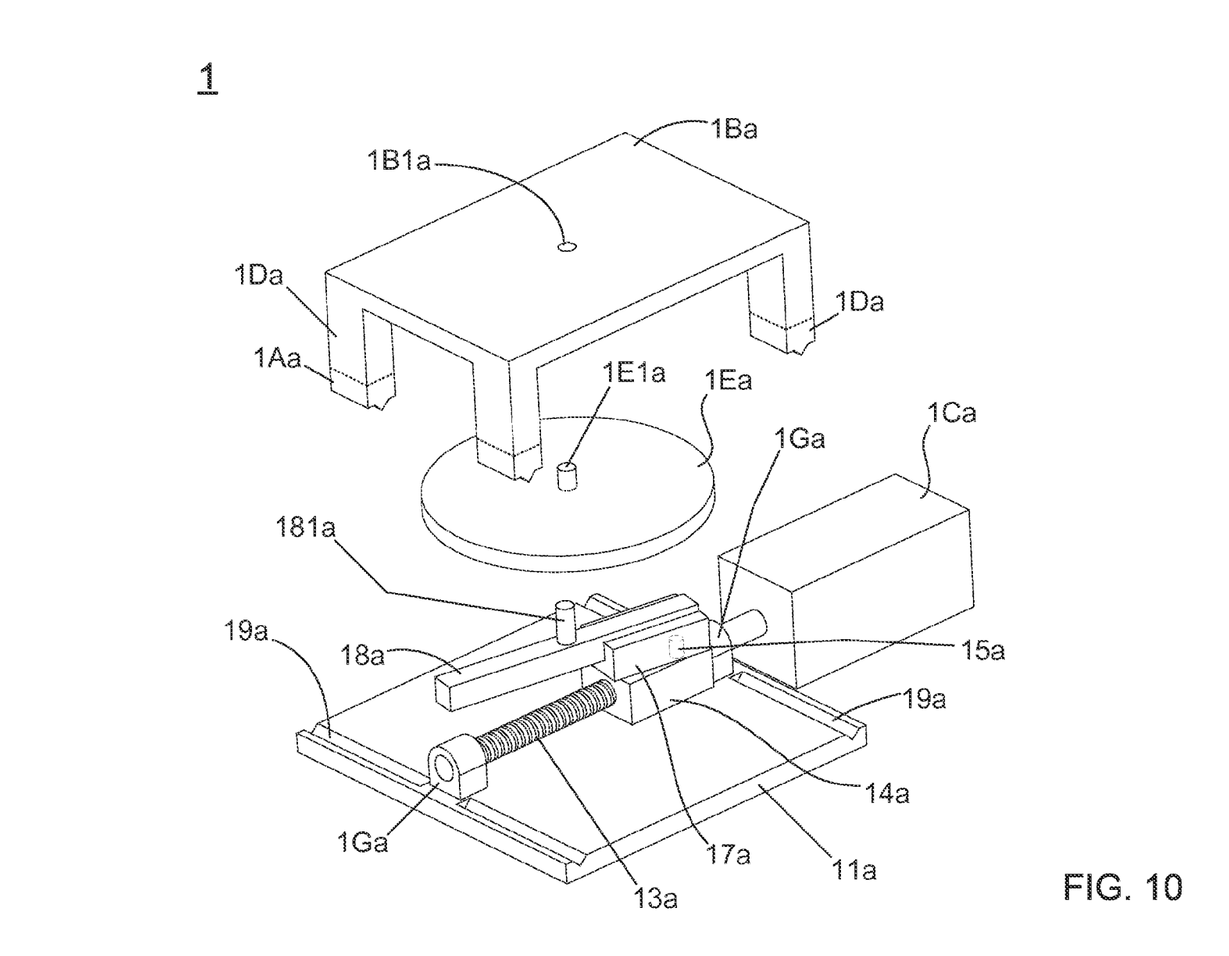
FIG. 10 is an exploded view of a second embodiment of the oblique-driven platform structure according to the present invention.

Besides, the oblique-driven platform structure of the present invention also includes a second embodiment. Please refer to FIG. 10, which illustrates an exploded view of the second embodiment of the oblique-driven platform structure. As shown in FIG. 10, the second embodiment of the oblique-driven platform structure 1 includes: a base 11a, a screw 13a, four first rails 19a, a first sliding block 14a, a rotation axis 15a, a second sliding block 17a, a oblique slide rod 18a, four third sliding block 1Aa, a work platform 1Ba, a motor 1Ca, four supporting member 1Da, a platform connecting member 1Ea, and two fixing block 1Ga.

The screw 13a is disposed on the base 11a through the two fixing block 1Ga, and the first sliding block 14a is disposed on the screw 13a, so that the first sliding block 14a is able to slide on the base 11a through the rotation of the screw 13a. The second sliding block 17a is disposed on the first sliding block 14a and includes an accommodating groove 171a. The oblique slide rod 18a is disposed on the second sliding block 17a and partially accommodated in the accommodating groove 171a, wherein an oblique drive angle θ is formed between the oblique slide rod 18a and the screw 13a, and the value of oblique drive angle θ is definable. In addition, the rotation axis 15a is disposed on the first sliding block 14a and located between the first sliding block 14a and the second sliding block 17a, wherein the rotation axis 15a can be rotated with a rotational degree of freedom for adjusting the value of the oblique drive angle θ.

As shown in FIG. 10, the first rail 19a is a V-shaped groove. The four first rails 19a are disposed on the base 11a pairwise and perpendicular to the screw 13a oppositely. The four third sliding clock 1Aa are respectively disposed on the first rails 19a and able to slide along the first rails 19a. The work platform 1Ba is simultaneously connected to the third sliding block 1Aa and the oblique slide rod 18a. The supporting members 1Da are disposed between the second sliding block 17a and the work platform 1B, used for supporting the work platform 1B and forming an altitude difference between the work platform 1B and the second sliding block 17a.

The platform connecting member 1Ea is disposed between the work platform 1Ba and the oblique slide rod 18a for making the work platform 1Ba connect to the oblique slide rod 18a by indirect way. In the second embodiment, the platform connecting member 1Ea can be rotated with a rotational degree of freedom. As shown in FIG. 10, a connecting member 181a is formed on the oblique slide rod 18a and located between the oblique slide rod 18a and the platform connecting member 1Ea, used for connecting the oblique slide rod 18a with the platform connecting member 1Ea. Moreover, a platform connecting member 1E1a is formed on the platform connecting member 1Ea and located between the platform connecting member 1Ea and the work platform 1Ba, used for connecting the platform connecting member 1Ea with the work platform 1Ba. In addition, the work platform 1Ba further includes an assembling member 1B1a, used for assembling with the platform connecting member 1E1a.

Thus, the second embodiment of the oblique-driven platform structure 1 has been clearly introduced through above descriptions. In the second embodiment, when the motor 1Ca is operated to drive the screw 13a, the first sliding block 14a would slide on the base 11a through the rotation of screw 13a, and the oblique slide rod 18a would simultaneously slide in the accommodating groove 171a for keeping the value of oblique drive angle θ. Moreover, when the oblique slide rod 18a slides in the accommodating groove 171a, the third sliding block 1Aa is driven by the oblique slide rod 18a and slides along the first rail 19a, so as to further drive the work platform 1Ba make displacement.

The same to aforesaid embodiment, in the second embodiment of the oblique-driven platform structure 1, there is a trigonometric relation between the oblique slide rod 18a, the screw 13a and the first rail 19a, and an oblique drive angle θ is formed between the oblique slide rod 18a and the screw 13a. By such mechanism design, platform displacement resolution of the work platform 1Ba can be kept to a constant in spite of the screw stroke position of sliding block is changed, such that the work platform 1Ba would get a feed rate with high stability and high resolution.

Furthermore, to increase the sliding stability of the first sliding block 14a, it can add a second rail (not shown) into the second embodiment. The second rail can be disposed on the base 11a, used for accommodating the screw 13a and the first sliding block 14a, so as to steady the slide of the first sliding block 14a. Comparing to aforesaid embodiment, although the second embodiment of the oblique-driven platform structure is a simpler embodiment and has poor stability, it has the advantage of low manufacturing and assembling cost.

The above description is made on embodiments of the present invention. However, the embodiments are not intended to limit scope of the present invention, and all equivalent implementations or alterations within the spirit of the present invention still fall within the scope of the present invention.

We claim:

1. An oblique-driven platform structure, comprising:
    a base;
    a first rail, being disposed on the base;
    a screw, being disposed on the first rail;
    a first sliding block, being disposed on the screw and able to slide along the first rail by way of the rotation of the screw;
    a second sliding block, being disposed on the first sliding block and having an accommodating groove;
    an oblique slide rod, being disposed on the second sliding block and partially accommodated in the accommodating groove, wherein an oblique drive angle is formed between the oblique slide rod and the screw, and the value of oblique drive angle is definable;
    at least one second rail, being disposed on the base and perpendicular to the first rail oppositely;
    at least one third sliding block, being disposed on the second rail and capable of sliding on the second rail back and forth;
    a work platform, being simultaneously connected to the third sliding block and the oblique slide rod; and
    a motor, being coupled to the screw;
    wherein when the motor is operated to drive the screw, the first sliding block slides along the first rail via the rotation of screw; and, when the first sliding block slides on the first rail, the oblique slide rod slides in the accommodating groove, to keep the value of oblique drive angle;
    wherein when the oblique slide rod slides in the accommodating groove, the third block is driven by the oblique slide rod and slides along the second rail, so as to drive the work platform to make displacement.

2. The oblique-driven platform structure as described in claim 1, further comprising:
- a rotation axis, being disposed on the first sliding block, and located between the first sliding block and the second sliding block;
- a rotation axis bearing block, being disposed on the rotation axis and located between the first sliding block and the second sliding block, wherein the rotation axis and the rotation axis bearing block is rotated with a rotational degree of freedom for adjusting the value of the oblique drive angle;
- at least one supporting member, being disposed on the base for supporting the second rail and forming an altitude difference between the second rail and the surface of the base; and
- a platform connecting member, being disposed between the work platform and the oblique slide rod for making the work platform connect to the oblique slide rod indirectly, wherein the platform connecting member is rotated with a rotational degree of freedom.

3. The oblique-driven platform structure as described in claim 2, further comprising:
- a motor base, being disposed between the motor and the screw for fixing the motor and steadying the screw; and
- a fixing block, being opposite to the motor and disposed on the base, used for connecting the first rail and the screw and fixing the first rail and the screw on the base.

4. The oblique-driven platform structure as described in claim 2, wherein the third sliding block further comprises:
- a sliding groove, wherein the third sliding block is connected to the second rail through the sliding groove; and
- a platform connecting portion, wherein the third sliding block is connected to the work platform through the platform connecting portion.

5. The oblique-driven platform structure as described in claim 2, wherein there is a trigonometric relation between the oblique slide rod, the screw and the second rail.

6. The oblique-driven platform structure as described in claim 5, wherein the displacement resolution of the work platform is modulated by rotating the rotation axis and the rotation axis bearing block to adjusting the value of oblique drive angle.

7. An oblique-driven platform structure, comprising:
- a base;
- a screw, being disposed on the base through two fixing block;
- a first sliding block, being disposed on the screw and able to slide on the base back and forth by way of the rotation of the screw;
- a second sliding block, being disposed on the first sliding block and having an accommodating groove;
- an oblique slide rod, being disposed on the second sliding block and partially accommodated in the accommodating groove, wherein an oblique drive angle is formed between the oblique slide rod and the screw, and the value of oblique drive angle is definable;
- at least one first rail, being disposed on the base and perpendicular to the screw oppositely;
- at least one third sliding block, being disposed on the first rail and capable of sliding on the first rail back and forth;
- a work platform, being simultaneously connected to the third sliding block and the oblique slide rod; and
- a motor, being coupled to the screw;
- wherein when the motor is operated to drive the screw, the first sliding block slides on the base via the rotation of screw; and, when the first sliding block slides, the oblique slide rod simultaneously slides in the accommodating groove, to keep the value of oblique drive angle;
- wherein when the oblique slide rod slides in the accommodating groove, the third block is driven by the oblique slide rod and slides along the first rail, so as to drive the work platform to make displacement.

8. The oblique-driven platform structure as described in claim 7, further comprising:
- a rotation axis, being disposed on the first sliding block, and located between the first sliding block and the second sliding block, wherein the rotation axis is rotated with a rotational degree of freedom for adjusting the value of the oblique drive angle;
- at least one supporting member, being disposed between the second sliding block and the work platform, used for supporting the work platform and forming an altitude difference between the work platform and the second sliding block; and
- a platform connecting member, being disposed between the work platform and the oblique slide rod for making the work platform connect to the oblique slide rod indirectly, wherein the platform connecting member is rotated with a rotational degree of freedom.

9. The oblique-driven platform structure as described in claim 8, further comprising:
- a connecting member, being formed on the oblique slide rod and located between the oblique slide rod and the platform connecting member, used for connecting the oblique slide rod with the platform connecting member; and
- a platform connecting member, being formed on the platform connecting member and located between the platform connecting member and the work platform, used for connecting the platform connecting member with the work platform.

10. The oblique-driven platform structure as described in claim 9, wherein the work platform further comprises an assembling member, used for assembling with the platform connecting member.

11. The oblique-driven platform structure as described in claim 8, wherein the first rail is a V-shaped groove.

12. The oblique-driven platform structure as described in claim 8, wherein there is a trigonometric relation between the oblique slide rod, the screw and the first rail.

13. The oblique-driven platform structure as described in claim 8, wherein the displacement resolution of the work platform is modulated by rotating the rotation axis to adjusting the value of oblique drive angle.

14. The oblique-driven platform structure as described in claim 7, further comprising a second rail, which is disposed on the base and used for accommodating the screw and the first sliding block, so as to steady the slide of the first sliding block.

* * * * *